United States Patent
Schwarz et al.

(10) Patent No.: US 10,328,677 B2
(45) Date of Patent: Jun. 25, 2019

(54) TEXTILE COMPOSITE ARTICLE

(75) Inventors: Stephen Schwarz, Kirchheim (DE); Werner Stuebiger, Neubiberg (DE); Susanne Petzoldt, Baierbrunn (DE)

(73) Assignee: W. L. Gore & Associates GmbH, Pitzbrunn (DE)

( * ) Notice: Subject to any disclaimer, the term of this patent is extended or adjusted under 35 U.S.C. 154(b) by 1051 days.

(21) Appl. No.: 13/504,489

(22) PCT Filed: Nov. 9, 2010

(86) PCT No.: PCT/EP2010/067118
§ 371 (c)(1),
(2), (4) Date: Jul. 2, 2012

(87) PCT Pub. No.: WO2011/054967
PCT Pub. Date: May 12, 2011

(65) Prior Publication Data
US 2013/0004747 A1     Jan. 3, 2013

(30) Foreign Application Priority Data

Nov. 9, 2009 (EP) .................................. 09014018

(51) Int. Cl.
*B32B 5/02* (2006.01)
*D06N 7/00* (2006.01)
*B32B 27/12* (2006.01)

(52) U.S. Cl.
CPC ............. *B32B 27/12* (2013.01); *B32B 5/02* (2013.01); *D06N 7/0092* (2013.01);
(Continued)

(58) Field of Classification Search
USPC ............................................................. 428/196
See application file for complete search history.

(56) References Cited

U.S. PATENT DOCUMENTS

| 3,953,566 A | 4/1976 | Gore |
| 4,194,041 A | 3/1980 | Gore et al. |

(Continued)

FOREIGN PATENT DOCUMENTS

| CN | 85104314 | 10/1984 |
| DE | 9207695 | 8/1992 |

(Continued)

OTHER PUBLICATIONS

International Search Report, PCT/EP2010/067118, dated Jan. 19, 2011, 3 pages.

*Primary Examiner* — Lynda Salvatore
(74) *Attorney, Agent, or Firm* — Greenberg Traurig, LLP

(57) ABSTRACT

The application relates to a textile composite article comprising at least one textile made of fibers/filaments, especially in the form of yarns, having a partially internal discontinuous pattern of an impregnating material which penetrates at least partially a cross section of said first textile leading to impregnated areas and non-impregnated areas in accordance with the discontinuous pattern. The non-impregnated areas are air permeable and may comprise a functional coating.
Such a treated textile composite is air-permeable and water vapor permeable and has reduced water absorption and re-dry time. In one embodiment the textile composite article shows an additional enhanced flame protection.

25 Claims, 8 Drawing Sheets

(52) U.S. Cl.
CPC . *D06N 2209/121* (2013.01); *D06N 2209/123* (2013.01); *D06N 2211/10* (2013.01); *Y10T 428/2481* (2015.01)

(56) References Cited

U.S. PATENT DOCUMENTS

| | | | |
|---|---|---|---|
| 4,618,524 | A | 10/1986 | Groitzsch et al. |
| 5,418,051 | A | 5/1995 | Caldwell |
| 8,383,528 | B2 * | 2/2013 | Panse .......................... 442/136 |
| 8,753,461 | B2 * | 6/2014 | Panse .......................... 156/82 |
| 2004/0051082 | A1 * | 3/2004 | Child ................ A41D 31/0066 252/500 |
| 2004/0142143 | A1 | 7/2004 | Corden et al. |
| 2004/0248487 | A1 * | 12/2004 | Yasumitsu .................... 442/131 |
| 2009/0110919 | A1 * | 4/2009 | Panse .......................... 428/339 |
| 2010/0330275 | A1 * | 12/2010 | Panse .......................... 427/230 |

FOREIGN PATENT DOCUMENTS

| | | | |
|---|---|---|---|
| EP | 2034088 | | 3/2009 |
| WO | WO93/25745 | | 12/1993 |
| WO | WO 01/66851 | * 9/2001 | ..................... 15/643 |
| WO | WO2002088231 | | 11/2002 |

* cited by examiner

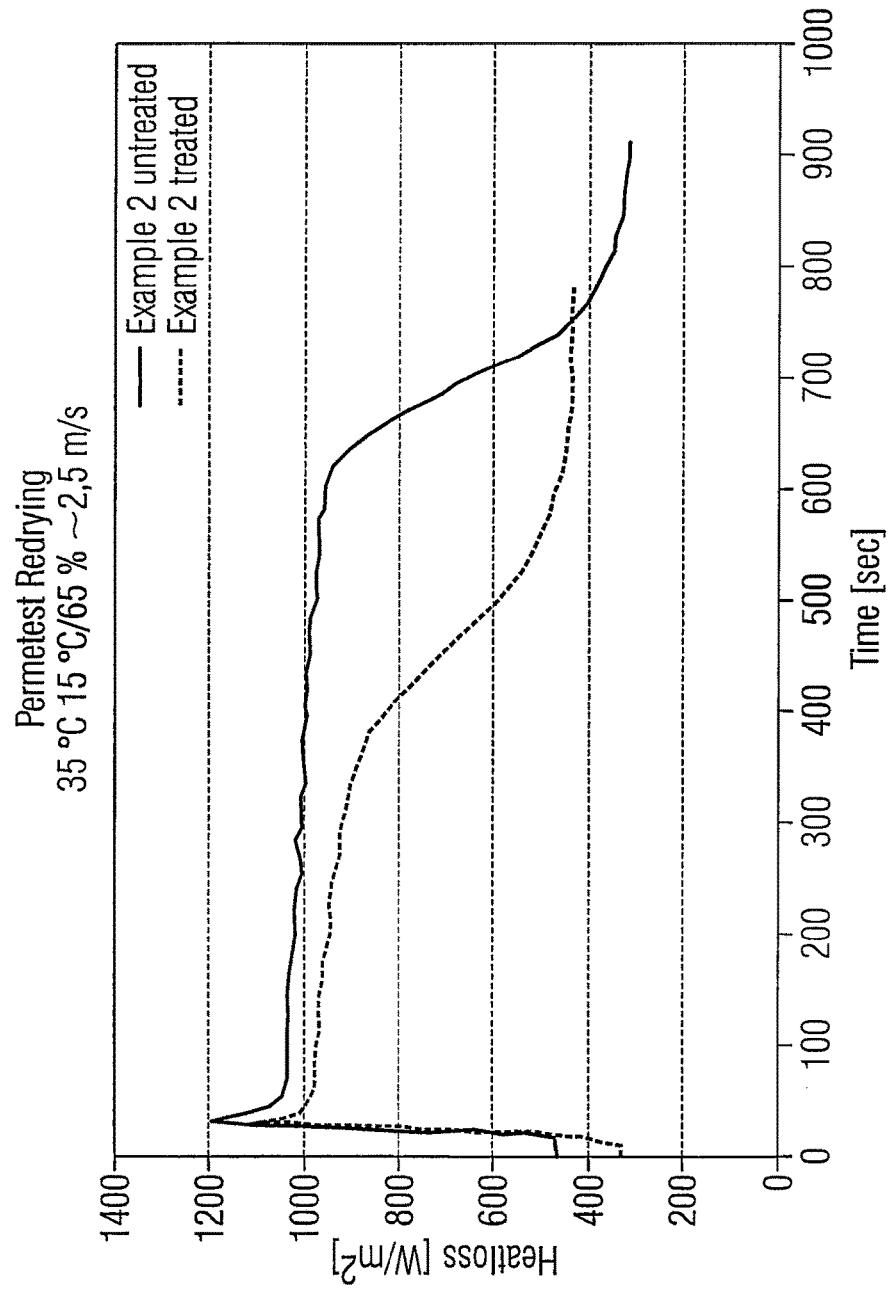

TEXTILE COMPOSITE ARTICLE

CONTINUING DATA

This application is a 371 of PCT/EP2010/067118 Nov. 9, 2010

FIELD OF THE INVENTION

The application relates to a textile composite article comprising at least one textile made of fibers/filaments, especially in the form of yarns, having a partially internal discontinuous pattern of an impregnating material leading to an air-permeable, water vapor permeable textile composite which has reduced water absorption and re-dry time. In one embodiment the textile composite article shows an additional enhanced flame protection.

BACKGROUND OF THE INVENTION

Textiles for clothing with a reduced ability to absorb water after contact with it are desired. Yarns for fabrics may be comprised of multi-filaments or staple fibers. Such yarns in the form of fiber/filament bundles comprise voids between the fibers/filaments. In case the yarn comes into contact with a liquid like water, most of the liquid wicks into the voids of the yarn. This wicking process results in a textile that will be wet, heavy and it takes long to dry.

One possibility to overcome this drawback is providing the fabrics with hydrophobic finishes usually based on fluorocarbons. But these fabrics lose their water repellency after just a few washes.

Another possibility of how to treat a textile to make it water repellent is disclosed in EP 2034088 A1 in the name of W.L.Gore & Associates GmbH. EP 2034088 A1 describes a fabric comprised of yarns which are made up of multiple fibers and voids between the fibers. The fabric has a very open textile construction with interstices between the yarns which have an average width of greater than 100 µm. The voids are filled up with a polymer material wherein the interstices remain open. The filling of the voids between the fibers prevents the absorption of water into said voids and therefore leads to reduced water absorption of the fabric. Textiles with such an open construction have a very limited use in the industry, the yarns itself may protected against outside water but the open and wide interstices still allow water to pass through into the garment. Furthermore, it is difficult to add an additional function to the textile by another treatment because the yarns are filled internally with said polymer material already.

U.S. Pat. No. 5,418,051 A assigned to Nextec Applications, Inc., relates to a flexible porous web which contains an internal coating of a silicone polymer composition. The web can comprise fibers in the form of monofilaments, yarns, staples or the like. The web may be a fabric which is woven or non-woven with fibers that can be of any desired composition. The web contains a curable silicone polymer impregnant that is present as a film, or coating, or a layer within a web that envelopes at least a portion of the fibers of the web. The interstices in the region of the internal coating are mostly filled or plugged by impregnant. The outer surfaces of the web are substantially free of impregnant. Silicone polymer which substantially completely encapsulates a web's fibers and forms an internal layer means, that the silicone polymer is located mostly upon surface portions of the fibers in the interior of the web. Based on the internal coating layer, the fibers of the outer surfaces of the web are uncoated and therefore able to wick water into the web. In order to avoid this, a fluorochemical is used to impregnate the web before the silicone polymer is applied. It is known that such impregnated webs lose their water repellency after just a few washes. Furthermore, such webs with an internal coating layer are not air-permeable because of the internal layer or the film by the silicone polymer.

Usually protective clothing for industrial workers and law enforcement are made of polycotton dense textiles. Polycotton textiles are not expensive but have very high water absorption and a re-dry time of several hours.

Firefighters, industrial workers, law enforcement and the like need garments that protect them not only from weather conditions but also from hazardous liquids, heat and flame. In particular, protection from flame requires materials that both self-extinguish and prevent burn caused by heat transfer through a garment. In addition, liquid and flame protection clothing should have a level of breathability sufficient to reduce heat stress burden to extend their ability to perform the function or to prevent heat casualty. Flame protective materials comprising non-combustible, non-melting fabric made of, for example, aramides, polybenzimidazole (PBI), poly p-phenylene-2,6-benzobisoxazole (PBO), modacrylic blends and combinations thereof. These fibers may be inherently flame resistant but may have several limitations. Specifically, these fibers may be very expensive, difficult to dye and print, and may not have adequate abrasion resistance. Additionally, these fibers pick up more water and offer unsatisfactory comfort as compared to nylon or polyester based fabrics. Furthermore, additional hydrophobic, oleophobic or the like treatments are also difficult, based on the unique chemical structure of said flame protective material.

The present invention overcomes the deficiencies described above.

One object of the present invention is to provide for an improved textile composite having a low water absorption value, a fast re-dry time and is still air permeable.

Another object of the present invention is to provide a textile composite with a low water absorption value, high air permeability and which is flame resistant.

A further object of the present invention is to provide a textile composite that comprises an outer meltable, flammable textile which is flame resistant, air permeable and water resistant while being having a low water absorption value and a fast re-dry time.

Furthermore, for optimum user performance in environments with occasional flash fire exposure, a lightweight, water vapor permeable and water resistant garment with enhanced burn protection is desired.

SUMMARY OF THE INVENTION

The present invention provides a textile composite article according to claim 1, the dependent claims refer to embodiments of said textile composite article. The invention also covers clothing made of the textile composite article of claim 1.

The invention describes a textile composite article comprising a first textile with an inner surface and an outer surface. The first textile comprises multiple fibers/filaments having voids between the fibers. In one embodiment the first textile comprises yarns with multiple fibers/filaments and interstices between the yarns. The first textile comprises a discontinuous pattern of an impregnating material which penetrates at least partially a cross section of said first textile between its inner surface and outer surface leading to impregnated areas and non-impregnated areas in accordance with the discontinuous pattern. At least a portion of the voids in the impregnated areas are filled up with said impregnating material wherein the textile composite has a water absorption value of 70% or less according to DIN EN 29865 (1991). In an embodiment having interstices between yarns in impregnating areas also at least a portion of the interstices between the yarns are filled up with said impregnating material. The at least partially penetration of the impregnating material leads to a partially internal discontinuous pattern of the impregnating material.

In one embodiment the first textile comprises a dense textile structure. Such a dense first textile means any tight manufacture textile construction made of yarns like a knit or a woven structure or made of fibers/filaments like a non-woven. Such tight manufactured textile constructions have substantially small interstices between the yarns or no interstices between the fibers/filaments in a non-woven. The air-permeability and/or water vapor permeability of a dense textile results from the voids between the multiple fibers/filaments and if exist the small interstices between the yarns.

The first textile comprises in one embodiment a dense manufactured textile structure made of yarns with interstices between the yarns. Said dense textile is characterized by an average size of the interstices between the yarns of less than 100 µm measured within 1 cm$^2$.

The first textile is an outer textile which means it may form the outermost layer of a clothing or garment.

In one embodiment the first textile may made of polycotton.

In another embodiment the first textile may made of at least one meltable material; the meltable material may be flammable. Textiles which be considered as meltable including but not limited to polyamides such as nylon 6 or nylon 6,6, polyester, polypropylene. The use of meltable materials is very beneficial because such materials are cheap, easy to dye and print and have an adequate abrasion resistance.

In a further embodiment the first textile may be made of at least one non-meltable material or of a thermally stable textile like aramids, flame resistant (FR) cottons, PBI, PBO, FR rayon, modacrylic blends, polyamines, carbon, fiberglass, PAN, polytetrafluoroethylene (PTFE), and blends and combinations thereof.

The filling of the voids between the fibers/filaments with the impregnating material prevents the absorption of liquid into said voids. The impregnating material is substantially located only within the voids between fibers/filaments in the impregnated areas defined by the discontinuous pattern. The at least partially penetration of the impregnating material into the cross section means that depending of the discontinuous pattern there are impregnated areas and non-impregnated areas. The impregnated areas are discrete single units of penetrated impregnating material which are completely disconnected to adjacent impregnated areas.

At least a portion of the voids in the impregnated areas are filled up, means that there may be voids in the impregnated areas which are not filled by the impregnating material.

In the embodiment having yarns and interstices between the yarns, also the interstices are at least partially filled up within the impregnated areas. In general, the impregnating material is able to penetrate into the cross section and fill any spaces and volumes (voids/interstices) within the textile construction (fibers/filaments/yarns) and therefore block the filled spaces/volumes entirely for liquids. This leads to a internal discontinuous pattern of impregnated areas and non impregnated areas.

The grade or depth of penetration or filling according to the invention is different to a disposition of a material within surface pores or surface voids of a textile.

In one embodiment the amount of impregnating material is at least 10% of the first textile weight. In another embodiment the amount of impregnating material is at least 30% of the first textile weight. In a further embodiment the amount of impregnating material is at least 50% of the first textile weight.

In one embodiment a majority of the voids in the impregnated areas are filled up with the impregnating material. A majority of the voids means that more than half of the voids in the impregnated areas are filled up. A majority of the voids means that the voids in the impregnated areas are filled up to a value of 50% or more, 60% or more, 70% or more, 80% or more, 90% or more. It is possible to fill substantially all voids within the impregnating areas. The grad of filling the voids depends on the amount of impregnating material and the discontinuous pattern. As more voids are filled as much reduced will be the water absorption value of the textile composite. On the other hand the air permeability and/or water vapor permeability may decrease and the textile composite may have an increase weight and stiffness. Also the distance between the impregnated areas and non impregnated areas depending on the discontinuous pattern may influence the water absorption value, the air permeability and the water vapor permeability of the textile composite.

In a further embodiment the inner and outer surface of the first dense textile remains substantially unchanged and at least partially free of impregnating material even in the impregnated areas. The impregnated areas are located mainly within the middle internal part of the cross-section of the first textile. At least partially free of impregnating material means that small portion of the impregnating material may stay on parts of the outer and/or inner surface of the textile as a very thin layer after the impregnation process. This leads to a textile with a substantially unchanged textile hand, meaning that the textile nature/characteristic of the textile is maintained and the textile itself is soft, with a good feel, a firm grip and no sticky touch.

Such treated textile composite with said filled voids prevent liquid from wicking into the yarn in the impregnated areas. Within the impregnated areas of the textile a liquid can stick only to the outer surface of the yarn but is not able to wet the void volume within the yarn. Therefore the water absorption value of the textile composite is reduced in comparison to an untreated textile. The water absorption values of the textile composite is 70% or less, 50% or less, 40% or less, 30% or less, 20% or less, 10% or less according to the Bundesmann test (DIN EN 29865, 1991).

Furthermore, such treated textile composite shows an improved re-dry behavior, the re-dry time of the treated textile composite is less than for a textile composite without the inventive treatment.

To ensure air-permeability and/or water vapor permeability of the textile composite, the impregnating material is applied to the textile in a discontinuous pattern leading to a discontinuous pattern of impregnated areas and non-impregnated areas.

The non-impregnated areas lead to an air-permeability and/or water vapor permeability of the inventive textile composite article. The air permeability is greater than 300 l/m$^2$/s in one embodiment. In a further embodiment the air-permeability is greater than 150 l/m$^2$/s and furthermore greater than 20 l/m$^2$/s and furthermore greater than 5 l/m$^2$/s.

In one embodiment the discontinuous pattern is in the form of discrete discontinuous dots and/or lines. Said dots may have a circular shape, a squared shape, a rectangular shape, a quadratic shape or mixtures thereof. Said lines may have a straight shape, a corrugated shape, a curved shape or mixtures thereof. Depending on the pattern, the dots and lines can be arranged closer or wider to each other.

The impregnating material can be selected from the group comprising silicone, polyurethane, amorphous perfluoropolymer or mixtures thereof. Commercially available amorphous perfluoropolymers are known as Teflon® AF (DuPont), Hyflon® AD (Solvay Solexis) and Cytop® (Asahi Glass). Teflon® AF is a family of amorphous fluoropolymers made by DuPont, which are made by the copolymerization of 2,2-bis-trifluoromethyl-4,5-difluoro-1,3-dioxole (PDD) with other fluorine-containing monomers. At present the commercial Teflon® AF grades are copolymers of PDD and tetrafluoroethylene (TFE) and are known as Teflon® AF1600 and Teflon® AF2400.

In particular embodiments the impregnating material is comprised of at least one silicone or silicone rubber.

The impregnating material needs a low viscosity to be wicked by capillary forces into the voids between the fibers/filaments, especially of the yarn.

Possible impregnating materials for use have a viscosity prior to filling up the voids of less than 5000 mPa/s. In a further embodiment the viscosity of the impregnating material is about 20000 mPa/s or less. Furthermore the impregnating material has substantially no swelling properties and/or solubility in liquids. The impregnating material may or may not be cross-linked.

In another embodiment the impregnating material contains one or several additives.

In a further embodiment the impregnating material contains at least one additive comprises expandable graphite. The expandable graphite works as a fire blocker in case of heat contact. The expansion properties of the expandable graphite block the heat and prevent the textile composite from burning. Therefore the use of expandable graphite improves the heat and/or flame protective properties of substrates where it is disposed.

In a further embodiment of the invention the non-impregnated areas of the first textile comprises at least partially at least one functional coating material leading to coated areas. Coating areas mean the non-impregnated areas where the outer surface of the yarns is covered with the functional coating material and the voids are substantially free of the functional coating material. The coated areas are still air- and/or water-vapor permeable. The functional coating material may add additional favorable features to the textile. For example, the functional coating material may be selected from the group consisting of hydrophobic material, hydrophilic material, oleophobic material, insect repellent materials and mixtures thereof. An example for an insect repellent material may be Permethrin.

A second textile may arrange to the first textile adjacent to the inner surface of the first textile. In one embodiment the second textile may comprise a dense textile structure as described for the first textile. The second textile has a first surface and a second surface and comprising multiple fibers/filaments having voids between the fibers/filaments. In one embodiment the second textile have yarns with multiple fibers/filaments and interstices between the yarns.

In one further embodiment the second textile is bonded to the first textile by the impregnating material. In that case the impregnating material penetrates also at least partially a cross section of said second textile from the first surface to the second surface leading to a discontinuous pattern of impregnated areas and non-impregnated areas in accordance with the discontinuous pattern of the impregnating material, wherein at least a portion of the voids in the impregnating areas are filled up with said impregnating material. In an embodiment using yarns also at least a portion of the interstices between the yarns are filled up with said impregnating material.

In one embodiment a majority of the voids in the impregnated areas of the second textile are filled up with the impregnating material. A majority of the voids means that the voids in the impregnated areas are filled up to a value of 50% or more, 60% or more, 70% or more, 80% or more, 90% or more. It is possible to fill substantially all voids within the impregnating areas.

The filling value of the voids in the second textile depends on the discontinuous pattern and on the amount of impregnating material put to the first textile. As more voids are filled as well in the second textile as much lower will be the water absorption value of the second textile.

In a further embodiment the discontinuous pattern of impregnating material is applied to the inner surface of the first textile, and then the first surface side of the second textile is attached to the inner side of the first textile such that the discontinuous pattern is enveloped between the first and the second textile. The impregnating material is being forced in the voids of the first and the second textile using pressure and heat and filling a portion of the voids in the impregnated areas of both, the first and the second textile. The outer surface of the first textile and the second surface side of the second textile remain substantially unchanged and at least partially free of impregnating material in the impregnated areas. At least partially free of impregnating material means that small portion of the impregnating material may stay on parts of the outer and/or second surface of the textiles as a very thin layer after the impregnation process. This leads to a textile composite with a substantially unchanged textile hand, meaning that the textile nature/characteristic of the textile is maintained and the textile composite itself is soft, with a good feel, a firm grip and no sticky touch.

In one embodiment a textile composite article comprises a first textile and a second textile. The first textile is made of dense manufactured textile made of yarns with multiple fibers of polyamide or polyester which are meltable and not thermally stable. The second textile is made of a flame retardant material. The first and the second textile are bonded together by the impregnating material which contains expandable graphite (impregnating material blend). That impregnating material blend penetrates at least partially the cross section of said first dense textile and the second textile in a discontinuous pattern leading to impregnated areas and non-impregnated areas in both textiles according to the discontinuous pattern. At least a portion of the voids in the impregnated areas are filled up with said impregnating material blend wherein the textile composite has a water absorption value of 70% or less according to DIN EN 29865 (1991). With this embodiment a textile composite is provided which is easy to dye and print, which has reduced water absorption value and provides flame protection.

In another embodiment a barrier layer is adjacent to one side of said first or second textile in forming the textile composite article. The barrier layer may be a water vapor permeable barrier layer. Said barrier layer might be also liquid impermeable and/or gas impermeable. In most embodiments the barrier layer is a membrane or film and is combined with at least one backer textile layer.

The term "water vapor permeable" means a layer which ensures a water vapor transmission through said layer. The barrier layer may have a water vapor permeability measured as water vapour transmission resistance (Ret) of less than 20 m²Pa/W.

The term "barrier layer" as used herein is defined as a film, membrane or coating that provides a barrier to air penetration as a minimum, and ideally to a range of other gases, for example gas chemical challenges. The barrier layer is air impermeable and/or gas impermeable. The barrier layer is considered air impermeable if it has an air permeability of less than 5 l/m² (EN ISO 9237, 1995).

In a further embodiment the barrier layer also provides a barrier to liquid water penetration as a minimum, and ideally to a range of liquid chemical challenges. The layer is considered liquid impermeable if it prevents liquid water penetration at a pressure of at least 0.13 bar. The water penetration pressure is measured on a sample of the barrier layer based on the same conditions described with respect to the ISO 811, described herein.

The barrier layer comprises in one embodiment at least one water vapor permeable and air-impermeable membrane to provide air impermeable but water vapor permeable (breathable) characteristics. Preferably the membrane is also liquid impermeable, at least water impermeable. The use of an air impermeable but water vapor permeable membrane within the textile composite article leads also to an air impermeable but water vapor permeable textile composite article.

A suitable water impermeable and water vapor permeable flexible membrane for use herein is disclosed in U.S. Pat. No. 3,953,566 which discloses a porous expanded polytetrafluoroethylene (PTFE) material. The expanded porous PTFE has a microstructure characterized by nodes interconnected by fibrils. If desired the water impermeability may be enhanced by coating the expanded PTFE with a hydrophobic and/or oleophobic coating material.

The water impermeable and water vapor permeable membrane might also be a micro-porous material such as a high molecular weight micro-porous polyethylene or polypropylene, micro-porous polyurethanes or polyesters, or a hydrophilic monolithic polymer such as polyurethanes.

The combination of the barrier layer with the inventive textile composite provides clothing which offers good comfort and facilitates water repellency. By "clothing" is meant any article that can be worn, including footwear, hats, gloves, shirts, coats, trousers, etc.

In one embodiment the textile composite article according to the invention comprises a first textile and water vapor permeable and liquid water impermeable membrane comprised of porous expanded polytetrafluoroethylene (ePTFE) which is bonded to the inner side of said first textile by the impregnating material. In another embodiment the membrane is laminated to at least one backer textile layer using at least one discontinuous adhesive or the same impregnating material.

The present invention describes an improved textile composite article which offers higher comfort and protection. Based on the filled voids and interstices within the impregnated areas and the water vapor permeable non impregnated areas, the textile composite shows a limited water wicking and a low water absorption value, a faster re-drying process, a reduced evaporation heat loss and a low increase of weight after rain.

The impregnated textile composite comprising an impregnating material blend with expandable graphite according to the invention offers also flame resistance. Especially in the case the textile composite comprises a first textile uses an impregnating material blend with expandable graphite and a second textile comprised of flame retardant material and bonded to the inner surface of the first textile by the impregnating material blend, said textile composite has a flame resistant according to ISO 15025 (2003).

BRIEF DESCRIPTION OF THE DRAWINGS

FIG. 15 is a graphical representation of the re-dry time of samples described herein.

DETAILED DESCRIPTION OF THE INVENTION

By "textile" is meant a fabric material made from yarns comprising fibers/filaments. In particular the term "textile" as used herein refers to a dense manufactured sheet-like structure (e.g. knitted or woven) comprised of yarns.

The term "yarn" as used herein refers to a continuous strand comprised of a multiplicity of fibers, filaments, or the like in a bundled form, such as may be suitable for knitting, weaving or otherwise used to form a fabric. Yarn occurs as a number of fibers that are twisted together (spun yarn) or a number of filaments without twist (a zero-twist yarn) or twisted. Yarn is comprised of a plurality of associated or inter-engaged fibers/filaments having voids defined therebetween. The yarn may also be comprised of one single monofilament.

The term "void" as used herein refers to the empty space/volume between the fibers or filaments, especially within a yarn. The void space can also be described as the capillary space between the fibers/filaments within a yarn. The voids are usually filled with air. The average size of a void may be between 0-50 μm, depending how tight the fibers/filament are arranged within the yarn.

The term "fiber" as used herein refers to a pliable, natural or man-made thread-like object. Fibers can be regarded as being in the form of units which can be formed by known techniques or the like.

The term "filament" as used herein refers to a man-made thread of indefinite length.

The term "interstices" as used herein refers to the space/opening between yarns within a textile structure comprising of spun fibers or filaments. In a dense textile the average size of the interstices is less than 100 μm measured within 1 cm². In a woven textile an interstice is formed at the crossing point between two parallel warps yarns and two parallel weft yarns (see FIG. 3). In a dense woven textile the average size of the interstices is less than 100 μm measured within 1 cm², preferably less than 50 μm measured within 1 cm², preferably the size of the interstice has a value of zero.

The term "laminate" as used herein refers to at least two individual layers, which are bonded via an adhesive or otherwise.

This invention describes a textile composite article with reduced water absorption of yarns comprised of multiple fibers/filaments used in the textile composite. In particular, this invention describes a textile composite which is treated to reduce and prevent the storage of liquid in the open voids between the fibers/filaments of the yarns. The invention especially prevents the capillary wetting of the yarns used in the textile composite. In one embodiment the treatment of the yarns can leads in addition to a textile composite with enhanced flame retardancy.

Figure 1:
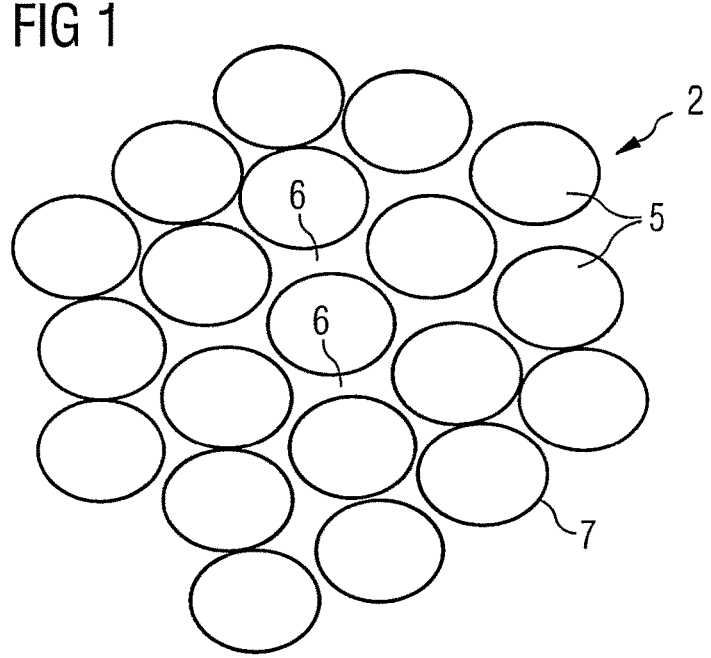
FIG. 1 depicts a cross-section through an untreated yarn with multiple fibers.

FIG. 1 shows in a schematic cross section view a typical yarn 2 for textiles which in itself is a bundle of fibers or filaments 5. Such yarns 2 are well known in the prior art.

The yarn 2 in FIG. 1 consists of multiple fibers/filaments 5 with several voids 6 between the single fibers/filaments 5 of the yarn 2. When the yarn 2 comes in contact with a liquid like water, the liquid first rests on the outer surface 7 of the yarn 2 and then penetrates between the fibers/filaments 5 and fills up the void volume of the yarn 2.

Figure 2:
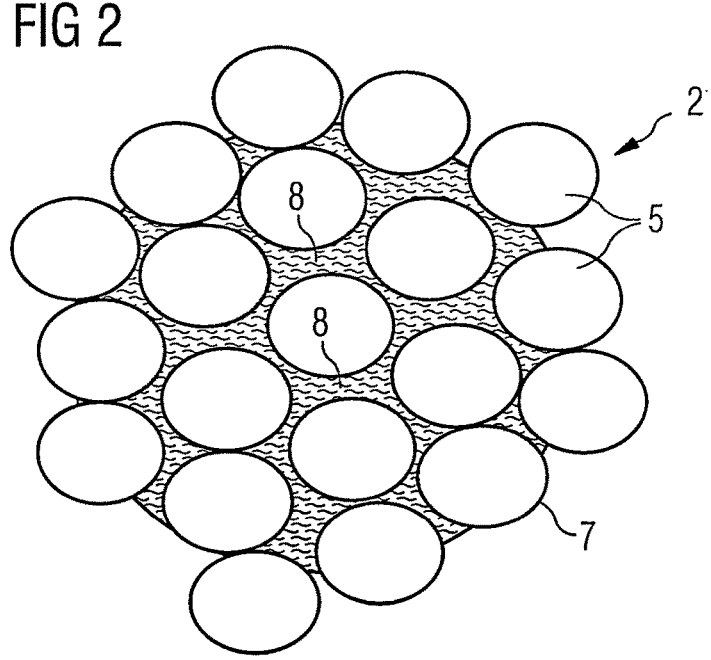
FIG. 2 depicts a cross-section through an untreated yarn with multiple fibers after contact with a liquid.

FIG. 2 shows such a liquid filled yarn 2. Yarn 2 consists of multiple fibers/filaments 5 wherein the void volume of the yarn 2 is completely filled up with a liquid 8 like water. As result the yarn 2 is heavier than before and the textile made of the yarn 2 gains undesired weight. In many cases it is possible that the water absorption amounts to more than 100 g/m². It is nearly impossible to remove the liquid 8 in a fast way from the voids 6. Therefore the re-dry time will be long.

Figure 3:
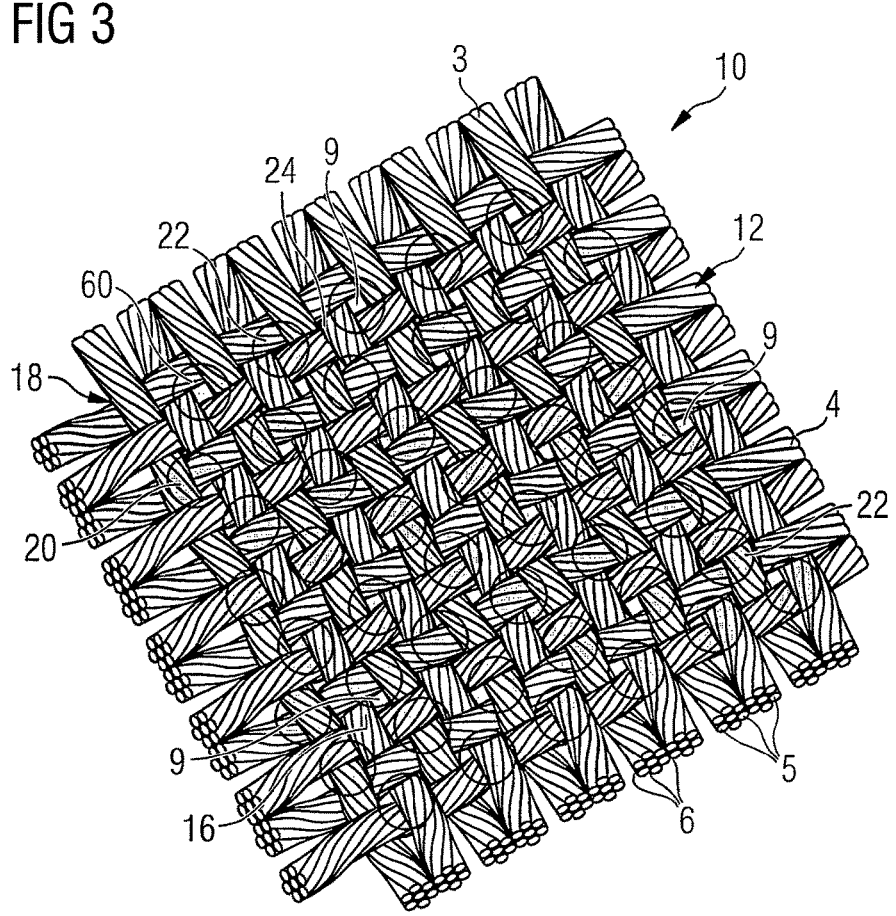
FIG. 3 depicts a textile composite article made of yarns with multiple fibers and a discontinuous pattern of an impregnating material.

FIG. 3 shows a textile composite article 10 according to the invention. The textile composite article 10 comprises a first textile 12 consisting of yarns 2 which form a woven with yarns 2 in the warp direction and in the weft direction. It is may made with warp yarns 3 and a weft yarns 4 count of between 10 and 50 yarns/cm.

The first textile 12 is a dense woven textile construction wherein small interstices 9 are formed at the crossing points between two parallel warps yarns 3 and two parallel weft 4 yarns with an average size of less than 100 μm measured within 1 cm². Some interstices 9 having a size of less than 100 μm measured within 1 cm², some interstices 9 are so small that the size has a value of zero. The first textile 12 comprises an inner surface 16 and an outer surface 18. The inner surface 16 of the textile 12 is directed to a person or away from the environment. The outer surface 18 of the textile 12 is directed away from a person, in one embodiment it is the outermost side of a garment which comes in direct contact with the environment (e.g. rain). Both surfaces are tight, dense, and compact and with only small interstices 9 based on the manufacture. Nevertheless the first textile 12 is at least water vapor permeable and therefore able to contribute to the comfort of the wearer as moisture can be transported from the body to the outside through the textile structure. Preferably the first textile 12 is air permeable.

In this embodiment all of the yarns 2 are bundles of fibers or filaments 5. The cross-sections of the yarns 2 in FIG. 3 show that each yarn 2 consists of multiple fibers or filaments 5 having voids 6 between the fibers 5 as described in FIG. 1. In the crossing points between two parallel warps yarns 3 and two parallel weft yarns 4 interstices 9 may be formed.

The illustrated inner surface 16 of the textile 12 shows a discontinuous pattern 20 of an impregnating material 60. The pattern 20 is in this embodiment in a dot-like manner. The discontinuous pattern 20 of the impregnating material 60 leads to impregnated areas 22 (the dots) and non-impregnated areas 24 (regions around the dots). The non-impregnated areas 24 are air permeable and water vapor permeable.

A discontinuous pattern means a pattern which may be formed by discrete discontinuously dots and/or interrupted lines of the impregnated material. Said dots may have a circular shape, a squared shape, a rectangular shape, a quadratic shape or mixtures thereof. Said lines may have a straight shape, a corrugated shape, a curved shape or mixtures thereof.

The dots or lines are arranged at a distance from each other so that discontinuous pattern 20 of the impregnating material 60 forms non-impregnated areas 24 next to impregnated areas 22.

The non-impregnated areas 24 are those areas in which the voids, interstices and fibers/filaments are free of the impregnating material 60. Therefore, the discontinuous impregnated textile is still air-permeable, at least water-vapor permeable.

In the impregnated areas 22 the impregnating material 60 has penetrated the cross-section of the textile such, that at least a portion of the voids 6 between the fibers 5 are filled up with the impregnating material 60. Also interstices 9 in the impregnated areas 22 are at least partially filled up with the impregnating material 60. The impregnated areas 22 are not air permeable and/or water vapor permeable.

The yarn 2 is selected from the group consisting of polyolefins, polyamides, polyester, regenerated cellulose, cellulose acetate, rayons, acetates, aramids, glass, modacrylics, cotton, polycotton, wool, silk, linen, jute and mixtures thereof. The yarn 2 is comprised of continuous multi filaments or staple fibers or combinations thereof. The fibers used to form the textile are not pre-treated. In one embodiment of the invention the yarn 2 comprises filaments made of polyamide. In another embodiment the yarn 2 comprises a mixture of polyester staple fiber and cotton. The yarn 2 for use to form the first textile 12 can be made using a number of prior art techniques. The yarn for example comprises a polyester or polyamide which is not pre-treated.

The textile may also comprise yarns comprised of a single monofilament. Such yarns comprised of a single monofilament have no voids and therefore cannot be filled up.

The textile can comprise a mixture of yarns being comprised of multiple fibers and yarns comprised of a single monofilament.

In a particular embodiment all yarns 2 of the textile 12 are comprised of multiple fibers/filaments.

The first textile 12 may be made of a knit textile structure, a woven textile structure, a non woven textile structure or a felt.

The first textile 12 may has a textile weight between 50 and 200 g/m$^2$. In one embodiment the first textile 12 has a weight of 90 to 110 g/m$^2$. In a further embodiment the untreated weight of the textile is about 180 g/m$^2$.

In one embodiment the first textile is an outer textile having a material which may be meltable, flammable, non-meltable or inflammable or combinations thereof. Such textiles are suitable as an outer textile including but not limited to polyamide 6, polyamide 6.6, polyester, and polypropylene.

The impregnating material 60 is comprised of a polymer material selected from the group comprising silicones, polyurethane, amorphous perfluoropolymers and mixtures thereof. The impregnating material 60 is comprised of at least one silicone or silicone rubber. In another embodiment the impregnating material 60 comprises non-swelling polyurethane. In a further embodiment the impregnating material 60 is comprised of amorphous perfluoropolymer like Teflon AF®.

In one embodiment silicones are used as impregnating material 60. The silicones used can be of the RTV-Type, LSR-Type or mixtures thereof. These silicones consist of two parts which are mixed before use.

The curing process of the RTV (room temperature vulcanization) silicones starts at the point of mixing at room temperature, but it accelerates with increasing temperature. A good curing temperature is between 120° C. and 180° C.

LSR (Liquid silicone rubber) silicones need a high temperature, that means between 160° C. and 200° C. for curing.

The curing time is dependent on the amount of silicone in the yarns, the line speed, and the length of the heating area and the selected temperature of the heating area.

The impregnating material 60, especially the silicones, may contain one or several additives. The additives used may be reflective agents, mildew-resistant agents, hand-altering agents, viscosity agents, rheology agents, and flexibility agents, ultraviolet agents, filling agents, electrically conductive agents, thermally conductive agents, flame retardants and radiation reflectivity agents.

The flame retardant agents may be boron compounds, alumina trihydrate, antimony oxides with halogen containing compounds, magnesium hydroxide, and organic or inorganic compounds containing phosphorous compounds.

In one embodiment the impregnating material may comprise expandable graphite. In a further preferred embodiment the impregnating material comprises a mixture or blend of silicone and expandable graphite.

Figure 4:
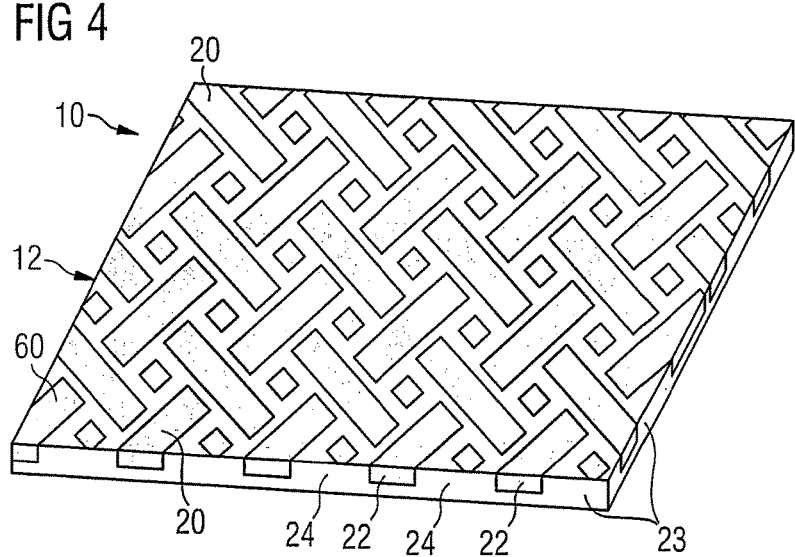
FIG. 4 depicts a schematic illustration of a textile composite article with a discontinuous pattern of an impregnating material in another embodiment.

FIG. 4 shows the textile composite article (10) as described in FIG. 3 but in another embodiment. The discontinuous pattern 20 of the impregnating material 60 is applied to the first textile 12 in a discontinuous dot and line configuration. The discontinuous pattern 20 forms across the cross section 23 of the first textile 12 a plurality of impregnated areas 22 and non-impregnated areas 24.

The discontinuous pattern 20 may have any configuration of discrete dots and/or discrete lines to ensure air- and water vapor permeability. The impregnating material 60 may be applied in an amount of at least 10% of the first textile weight, on another embodiment of at least 30% of the first textile weight and in a further embodiment at of at least 50% of the first textile weight.

The discontinuous pattern 20 is formed by applying the impregnating material 60 in a manner which provides a durable bond of the material within the voids and interstices in the impregnated areas 60 of the first textile 12. The application technique is selected so that the impregnating material 60 uniformly dispersed throughout the textile cross section 23 but limited to the impregnating areas 22.

The application of the impregnating material 60 to one surface of the first textile 12 may be carried out using any known impregnating technology. In one embodiment the application of the impregnating material is carried out by a gravure printing application method. The depth of penetration can be controlled by the viscosity of the impregnating material. Preferably, the viscosity is around 2000 mPa/s.

In a particular embodiment the application of the impregnation material is carried out according to the well know screen printing technology.

In one embodiment a continuous rotation screen printing process is used. In this screen printing process the impregnation material will be pressed through a screen roll pattern on the first textile. The lay down can be adjusted in primary by the screen roll pattern and the screen thickness but also in a smaller variety with the blade angle/shape in the screen roll and by the speed.

Afterwards a curing process takes place in an oven at temperatures of between 120° C. and 200° C. for a time of approximately 2 min, in some embodiments for a time of 1 min.

Other methods for applying the impregnating material may include screen printing, or spray or scatter coating or knife coating.

Figure 5:
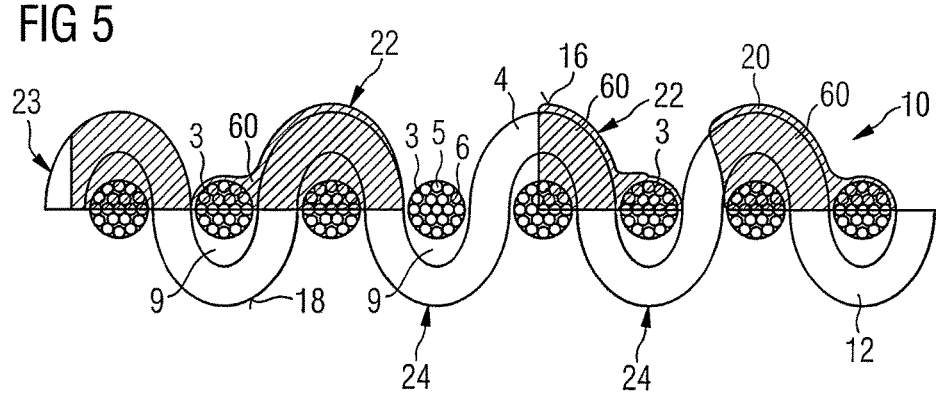
FIG. 5 depicts a schematic illustration of cross-section view of a first textile in one embodiment described therein.

FIG. 5 shows the cross section of the textile composite 10 of FIG. 3 in one embodiment. The woven first textile 12 comprises warp yarns 3 and weft yarns 4. The cross section 23 in FIG. 5 shows several cross sections of warp yarns 3 and a cross section of one weft yarn 4 which runs across from one side to the other side of the first textile 12. The warp yarns 3 and the weft yarns 4 comprise bundles of fibers/filaments 5. The cross-sections of the warp yarns 3 show that each yarn 3 consists of multiple fibers/filaments 5 having voids 6 between the fibers 5. Small interstices 9 are formed within the crossing points of the yarns 3, 4, especially between two parallel warps yarns 3 and two parallel weft yarns 4.

Said textile 12 comprises an inner surface 16 and an outer surface 18. According to the embodiment, the discontinuous pattern 20 of the impregnating material 60 is applied to the inner surface 16 of the textile 12, for example by using a rotation screen print machine.

FIG. 5 shows impregnated areas 22 formed by the impregnating material 60 which has been penetrated into the cross section 23 of the first textile 12. Such parts of the cross-section 23 without any impregnating material 60 form non-impregnated areas 24. Within the impregnated areas 22 the voids volume of the yarns 3, 4 or part of the yarns 3, 4 and the interstices 9 between the yarns are at least partially filled with the impregnating material 60. This results in a cross-section 23 where the fibers/filaments 5 are partially embedded in the impregnating material 60. In some embodiments the impregnating pattern 20 penetrates into the cross section 23 of the first textile 12 such that the inner surface 18 (or the outer surface) are free of impregnating material 60.

This is advantage because the textile hand of the first textile 12 remains unchanged.

In an optional embodiment it is also possible that the outer surface 16 is covered at least partially with a thin skin of impregnating material 60.

The non-impregnated areas 24 are those areas in which the voids 6 of the fibers/filaments 5 and the interstices 9 between the crossing points of the yarns 3, 4 are free of the impregnating material 60. Therefore, the discontinuous impregnated textile 12 is still air-permeable, at least water-vapor permeable.

In the impregnated areas 22 the impregnating material 60 has penetrated the cross-section 23 of the textile 12 such, that at least a portion of the voids 6 between the fibers 5 and the interstices 9 between the crossing points of the yarns 3, 4 are filled up with the impregnating material 60. The impregnated areas 22 are not air-permeable. In some embodiments the impregnated areas are not air- and water-vapor impermeable.

In one embodiment the majority of the voids 6 within the impregnated areas 22 are filled. In the embodiment using yarns also the interstices 9 within the impregnated areas 22 are filled in addition. The majority of the voids 6/interstices 9 mean more than 50% of the voids 6/interstices 9 in the impregnated areas 22, or more then 80% of the voids 6/interstices 9 in the impregnated areas 22, or more than 90% of the voids 6/interstices 9 in the impregnated areas 22. There are embodiments were about all voids/interstices (100%) in the impregnated areas 22 are filled.

The impregnated areas 22 are at least not air-permeable. The filled voids 6/interstices 9 in the impregnated areas 22 of the first textile 22 reduce and prevent liquid from penetrating into the void volume of the yarns 2 which leads to a significant decrease of the water absorption of the textile composite 10. Water absorption means the amount of water absorbed by the textile composite 10 when immersed in water for a predetermined period of time. The ratio of the weight of water absorbed by the textile 10 to the weight of the dry textile is the water absorption rate or water pick up in percentage.

Therefore the textile composite article 10 according to the invention has a water absorption value of about 70% or less according to DIN EN 29865 (1991). In other embodiments the water absorption value is about 50%, or less or about 40% or less or about 30% or less, or about 20% or less, or about 10% or less, according to DIN EN 29865 (1991).

The inventive impregnated textile composite 10 furthermore has a reduced re-dry time in comparison to the re-dry time of a non impregnated textile.

The time to re-dry a textile is the time that is needed to evaporate the total amount of water out of the textile. The re-dry time is also related to the ambient temperature and the ambient humidity. The time to dry is increasing with cooler temperatures and higher humidity. The total amount of water (g/m²) determines the re-dry time dependence on the climate conditions.

The impregnating material 60 penetrates into the interstices and the void volume of the yarns 2 between the inner surface 16 and the outer surface 18 forming impregnated areas 22 within the cross section 23 of the first textile 12. Preferably, the impregnated areas 22 are filling only partially the cross section 23 between the inner surface 16 and the outer surface 18. The impregnated areas 22 may be located in the middle area of the cross section 23 of the first textile 12 with a distance to the outer surface 18 and to the inner surface 16. In one further embodiment the impregnated areas 22 range based from the inner surface 16 into the cross section 23. In another embodiment the impregnated areas 22 proceed from the outer surface 18 into the cross section 23. In a further embodiment the impregnated areas 22 proceed from the inner surface 16 to the outer surface 18. The size and location of the impregnated areas 22 depends on the amount of impregnating material 60 which has been applied to one of the surfaces, depends on the viscosity of the impregnating material 60 and on the pressure and technology used to form the impregnated areas 60 within the first textile 12.

In a particular embodiment at least the fibers/filaments 5 within the outer surface 7 (see FIG. 1) of the yarn 2 are embedded in the impregnating material 60. In this embodiment the surface 7 of the yarn 20 is substantially free of the impregnating material 60.

In another embodiment the impregnating material 60 forms at least partially a thin outer skin around at least parts of the outer surface 7 of the yarn 20. Therefore the textile character of the textile 12 remains unchanged in comparison to the untreated textile.

The non-impregnated areas are free of impregnating material and therefore allow at least the transport of water vapor and air through the first textile 12.

Figure 6:
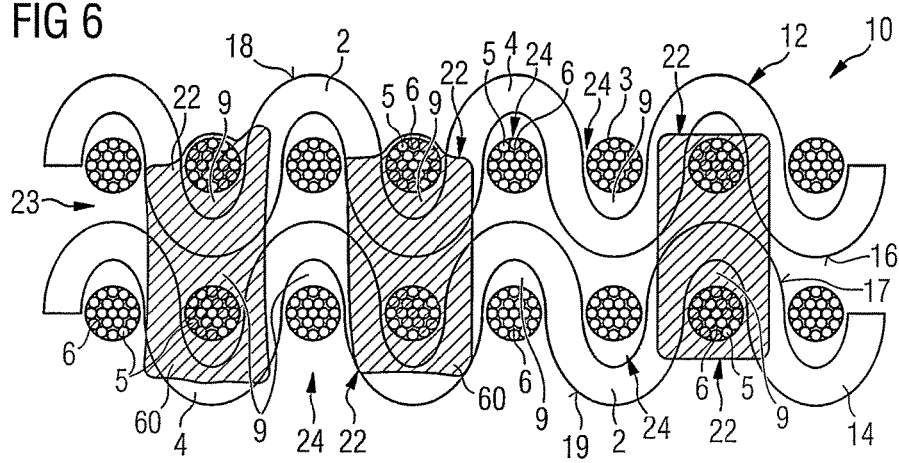
FIG. 6 depicts a schematic illustration of cross-section view of a first textile and a second textile bonded together by impregnating material in another embodiment described therein.

FIG. 6 shows the textile composite article 10 according to one further embodiment of the invention. The first textile 12, on the side opposite that on which forms the future outer surface 18 of clothing, can be adjacent to another layer to form a multi-layered textile composite. In the illustrated embodiment a second textile layer 14 is arranged adjacent to the inner surface 16 of said first textile 12. In another embodiment the first textile 12 and the second textile 14 are attached to each other by the discontinuous pattern 20 of the impregnating material 60. The second textile 14 may be a textile backer, preferably a thermally stable textile backer.

The second textile 14 may be woven, non-woven or knitted and may be made from a variety of materials such as polyester, polyamide, polyolefins and the like. In a further embodiment the second textile 14 may be made of at least one thermally stable textile like aramids, flame resistant/FR) cottons, PBI, PBO, FR rayon, modacrylic blends, polyamines, carbon, fiberglass, PAN, polytetrafluoroethylene (PTFE), and blends and combinations thereof.

The first textile 12 may have a textile structure as described in FIGS. 1 to 5 but all other textile structures are also possible. The second textile 14 may consists of yarns 2 which are bundles of fibers or filaments 5. The cross-sections 23 of the yarns 2 in FIG. 6 show that each yarn 2 consists of multiple fibers or filaments 5 having voids 6 between the fibers 5 as described in FIG. 1. Also interstices 9 may be formed between the crossing points of the yarns 2.

The second textile 14 is bonded to the first textile by the impregnating material 60. The impregnating material 60 penetrates into the textile structure of the second textile 14 and forms impregnating areas 22' and non-impregnating areas 24' within the second textile 14 according to the discontinuous pattern 20. Therefore depending on the penetration grade of the impregnating material 60, at least a portion of the voids 6 between the fibers/filaments 5 of the second textile 14 are filled up with the impregnating material 60. Also at least a portion of the interstices 9 within the impregnated areas 22' are filled up by the impregnating material 60.

The impregnating material 60 fulfills two main functions, as bonding material for the two textile layers 12, 14 and as filling material for the voids 6 and interstices 9 within the impregnated areas 22, 22'.

A method is also provided for constructing a textile composite article by bonding the two textile layers together. The method comprises providing a first textile and a second textile. The inner surface of the first textile is provided with a discontinuous pattern of the impregnating material for example by a gravure printing technique or a rotation screen print techniques. One side of the second textile is being brought in contact with the inner surface of the first textile. The first and the second textile were passing and pressed through the gap between two moving rollers to precede the impregnating material into the voids of the fibers and if present into the interstices between the yarns. The size of the gap, the velocity of the rollers and the pressure between the rollers define how deep the impregnating material penetrates into the cross section of the first and second textile.

Afterwards a curing process takes place in an oven at temperatures of between 120° C. and 200° C. for a time of approximately 2 min, in some embodiments for a time of 1 min.

Preferably the outer surface of the first textile and the second surface of the second textile remain free of impregnating material to keep the textile hand of the textile composite.

The method further comprising constructing clothing from the textile composite wherein the outer surface of the first textile is oriented to face away from the body of a wearer of the clothing.

Figure 7:
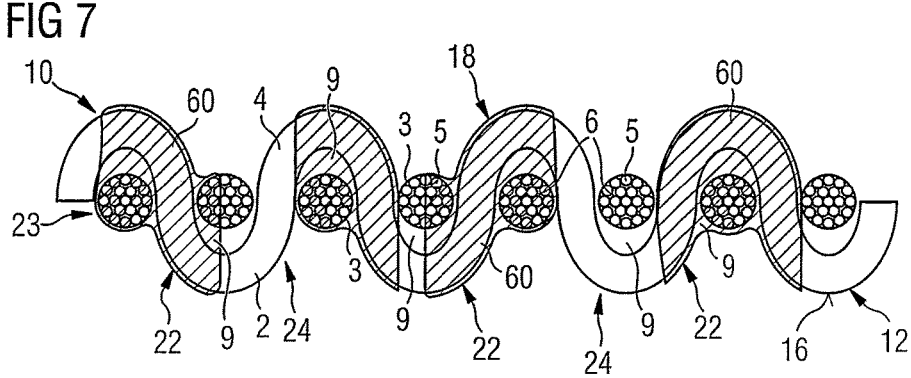
FIG. 7 depicts a schematic illustration of cross-section view of a first textile in one embodiment with impregnated areas made with impregnating material.

FIG. 7 shows another embodiment of a textile composite according to the invention. A first textile 12 as described in detail in the FIGS. 1 to 5 is illustrated. As described before, the first textile 12 comprises a discontinuous pattern 20 of an impregnating material 60 which penetrates the cross section 23 of said first textile 12 between the outer surface 18 and the inner surface 16 leading to impregnated areas 22 and non-impregnated areas 24. As exemplified in FIG. 7, the impregnating material 60 fills a majority of the voids 6 between the fibers 5 and the interstices 9 between the yarns 3, 4 so that impregnating areas 22 reach from the outer surface 18 to the inner surface 16. Therefore, on the outer surface 18 and on the inner surface 16 of the first textile 12, the discontinuous pattern may visible.

Figure 8:
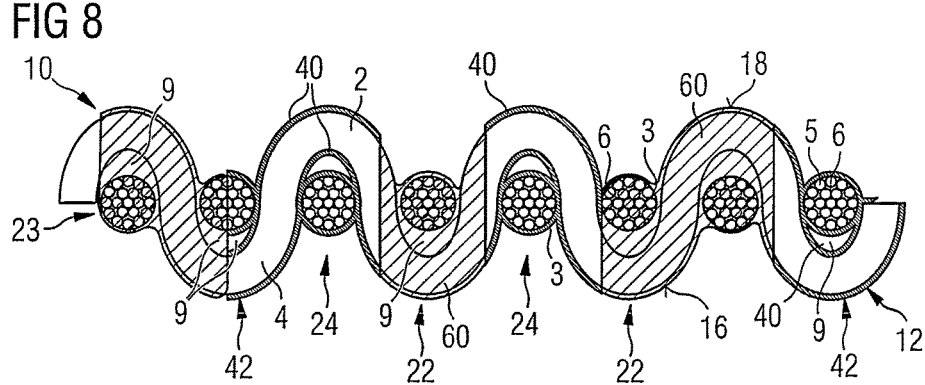
FIG. 8 depicts a schematic illustration of cross-section view of a textile in another embodiment with impregnated areas made with impregnating material and non-impregnated areas comprising a functional coating material.

FIG. 8 shows a further embodiment of the invention. An impregnated first textile 12 as described in FIG. 7 is illustrated. In this embodiment the non-impregnated areas 24 comprises partially at least one functional coating material 40. The functional coating material 40 may apply an additional feature to the textile composite like FR protection, oil- and/or water repellency or insect protection. The treatment of the non-impregnated areas 24 with a functional material 40 leads to coated areas 42. The coating 42 only covers the outer surface 7 (see picture 1) of the yarns 2 and the voids 6 and interstices 9 remain substantially free of the functional coating material 40. The coated non-impregnated areas 24 are still air- and water vapor permeable. Said functional coating material 40 may a hydrophobic material, a hydrophilic material, an oleophobic material, flame-retardants, insect repellent material and mixtures thereof. The functional coating material 40 in the non-impregnated areas 24 may apply after the impregnated areas 22 are formed.

A suitable process for applying the functional coating material 40 may be chosen from the group of minimal coating technologies like for example the Foulard application.

In one embodiment the functional coating material 40 is a hydrophobic material as available by the company Clariant under the name Nuva TTC or HPU or Nuva 2110.

Figure 9:
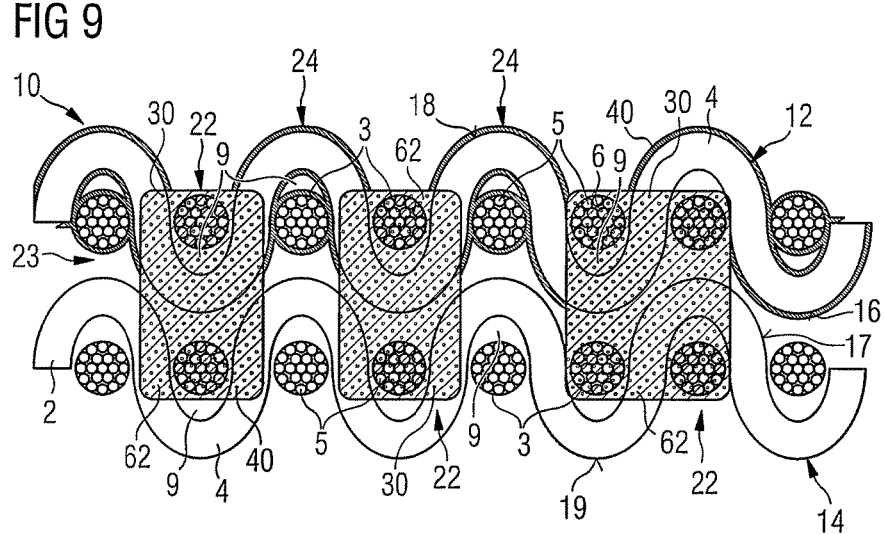
FIG. 9 depicts a schematic illustration of cross-section view of a first textile and a second textile attached to each other by impregnating material blend comprising expandable graphite.

In a further embodiment, as exemplified in FIG. 9, a first and a second textile 12, 14 are bonded together as described in FIG. 6. The impregnating material 60 contains in this embodiment expandable graphite 30 as an additive. That impregnating material blend 62 fills the voids 5 between the fibers/filaments 5 and the interstices 9 between the crossing points of the yarns 2 of the first and second textile 12, 14 and bonds both textile layers together.

Preferably the impregnating material 60 contains expandable graphite 30. Said impregnating material blend 62 comprises less than or equal to about 50 wt %, or less than or equal to about 40 wt %, or less than or equal to about 30 wt % expandable graphite based on the total weight of the impregnating material with graphite. In other embodiments the expandable graphite comprises less than or equal to about 20 wt % or less than or equal to about 10 wt %, or less than or equal to about 5 wt % of the impregnating material. Generally, from about 5 wt % to 50 wt % of expandable graphite based on the total weight of the impregnating material with graphite is desired. Depending on the properties desired and the construction of the resulting textile composites, other levels of expandable graphite may be suitable for other embodiments. Other additives such as pigments, fillers, antimicrobials, processing aids and stabilizers may also be added to the impregnating material. Expandable graphite particle size suitable for present invention should be chosen so that the impregnating material blend may be applied with the selected application method. For example, where the impregnating material blend is applied by a rotation screen print techniques, the expandable graphite particle size should be small enough to fit in the screen.

One expandable graphite suitable for use in this invention is expandable graphite available by the company NRC Nordmann (Germany), Rassmann Article: Nord-Min 251, article #102148 or Nord-Min 250, article#102147. The expandable graphite type Nord-Min 251 has an expansion volume of 250 ml/g. The particle size is for min 80% of the particles>0.3 mm. The expansion starts at a contact temperature of >180° C.

Preferably the impregnating material blend 62 comprises silicone and expandable graphite 30.

The impregnating material blend 62 with graphite 30 may be produced by a method that provides an intimate blend of polymer material and expandable graphite, without causing substantial expansion of the expandable graphite. Suitable mixing methods include but not limited to paddle mixer, blending and other low shear mixing techniques. In one method, the intimate blend of polymer material and expandable graphite particles is achieved by mixing the expandable graphite with into the premixed Silicone polymer (for example Wacker Elastosil LR 7665 in a mixture of 1:1 or Wacker Elastosil in a mixture of 1:1). In methods which provide an intimate blend of polymer material and expandable graphite particles or agglomerates of expandable graphite, the expandable graphite is coated or encapsulated by the polymer material prior to expansion of the graphite.

Textile composites made according to this embodiment (using an impregnating material blend with expandable graphite) having the ability to suppress after flame after exposure to a flame according to the horizontal flame test by ISO 15025 (2003).

The treatment of the first textile and the second textile with an impregnating material blend with an expandable graphite leads to a textile composite with an enhanced flame retardancy. An enhanced flame retardancy means the textile composite 10 shows an after flame of 10 sec or less after exposure to flame according to the vertical flame test of ISO 15025 (2003). Samples with an after flame of 10 sec or less after exposure to flame according to the vertical flame test of ISO 15025 (2003) were considered as non-flammable. Preferred samples have an after flame of 3 sec or less. Most preferred samples have no after flame at all.

Samples with an after flame time of greater than 10 sec were considered as flammable.

In one embodiment, a textile composite having a meltable outer textile provided with a discontinuous pattern of an impregnated material blend with expandable graphite and a thermally stable textile backer which is bonded by said impregnating material blend to the inner surface of the outer textile and where in use, the outer surface of the outer textile is oriented to come in contact with flame. When expose the outer surface of the outer textile to a flame the textile composite shows no after flame pass when tested according to the horizontal flame test by ISO 15025 (2003). Upon flame exposure, the meltable outer textile melts towards the impregnating material blend with expandable graphite. As the expandable graphite is expanding, it is believed the thermally stable textile backer holds the impregnating material in place to facilitate the absorption of melt of the meltable outer textile.

Furthermore, the non-impregnated areas 24 of the first textile 12 of the textile composite 10 in FIG. 9 comprise partially at least one functional coating material 40. The functional coating material 40 may apply an additional feature to the textile composite like FR protection, oil- and/or water repellency or insect protection. The treatment of the non-impregnated areas 24 with a functional material 40 leads to coated areas 42 as explained in more details in FIG. 8. In another embodiment also the second textile 14 may comprise at least one functional coating material in the non impregnated areas 24 leading to coated areas 42.

Figure 10:
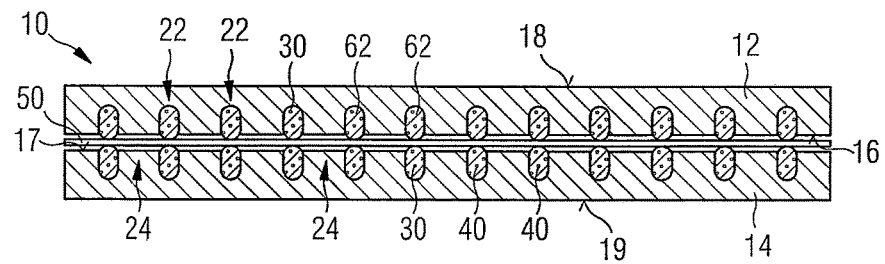
FIG. 10 depicts a schematic illustration of cross-section view of one embodiment with a first textile and a second textile and a barrier layer arranged in between; the first textile is bonded to the barrier layer by an impregnating material blend comprising expandable graphite and the second textile is bonded to the barrier layer by an impregnating material blend comprising expandable graphite.

FIG. 10 shows another embodiment of the invention in which the textile composite 10 comprises a barrier layer 50. In one embodiment of the invention the barrier layer 50 is water vapor permeable.

The barrier layer may be a membrane, a film or a laminate comprising polytetrafluoroethylene (PTFE), expanded PTFE, polyurethanes, or other suitable substrates.

The first textile 12, on the side opposite that on which forms the future outer surface 18 of clothing can be adjacent to a barrier layer 50 to form a multi-layered textile composite 10. In one example the first textile 12 is laminated to the barrier layer 50 using the impregnating material 62 as bonding adhesive. The second textile 14 is bonded to the barrier layer 50 using also the impregnating material 62 or a conventional bonding adhesive. In using the impregnating material 62 as bonding adhesive, a discontinuous pattern of impregnated areas 22 and non impregnated areas 24 were formed within the cross section of the first textile 12 and the second textile 14.

For example, the inner surface 16 of the first textile 12 may be attached or adhered to a barrier layer 50 like a water impermeable, water vapor permeable film or membrane, such as a monolithic breathable polyurethane or polyester polyether film or a porous especially microporous, polyethylene or polypropylene, or polyurethane. One embodiment of a membrane or film is composed of an expanded polytetrafluoroethylene (ePTFE) membrane disclosed in U.S. Pat. No. 3,953,566, which has a porous microstructure characterized by nodes interconnected by fibrils. The membrane is resistant to passage of liquid water therethrough but is water vapor permeable. The membrane may have a weight between 1 and 100 g/m².

In a membrane or film containing ePTFE, the ePTFE can be impregnated with a hydrophobic impregnant. The ePTFE may have on it a continuous layer of a film or coating of a water resistant, water vapor permeable material such as water vapor permeable polyurethane of the type disclosed in U.S. Pat. No. 4,194,041. The continuous water vapor permeable polymer layer is a hydrophilic polymer in the sense that it transports water molecules and will be referred to herein as a hydrophilic polymer. The hydrophilic layer selectively transports water by diffusion, but does not support pressure driven liquid or airflow. Therefore, moisture, i.e. water vapor, is transported but the continuous layer of the polymer precludes the passage of liquid water and such things as air-borne particles, micro organisms, oils or other contaminants.

The barrier layer 50 is at least air impermeable in one embodiment of the invention. The term "air impermeable" means that the barrier layer or the textile composite 10 with the barrier layer 50 has an air-permeability of less than 5 l/m².

In a further embodiment the barrier layer 50 is liquid impermeable. The term "liquid impermeable" means the barrier layer, or the textile composite 10 with the barrier layer having a water entry pressure of >0.13 bar (ISO 20811).

In another embodiment the first textile 12 is joined to an air impermeable, liquid impermeable and water vapor permeable barrier layer.

The embodiment of FIG. 10 shows a textile composite 10 according to the invention in which a barrier layer 50 is arranged between the first textile 12 and the second textile 14 forming a laminate. The bond between the barrier layer 50 and the two textile layers is via the impregnating material blend 62 as described before.

Figure 11:
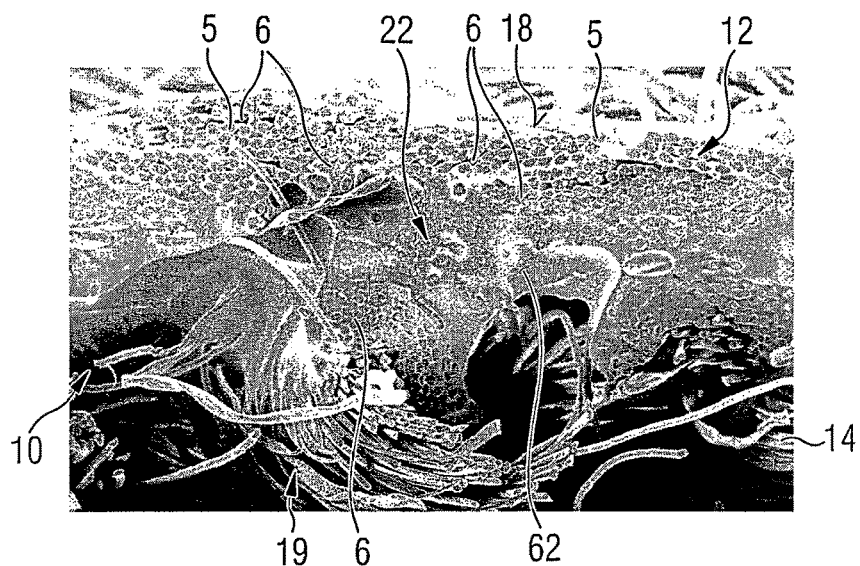
FIG. 11 depicts a scanning electron microscope photomicrograph (SEM) of the cross-section of an impregnated area of a textile composite.

FIG. 11 shows an SEM of the cross section of a textile composite 10 with two textile layers according to the invention. The woven first textile 12 and the knitted second textile 14 are bonded together by a discontinuous pattern of the impregnating material blend 62 (silicone and expandable graphite). The SEM shows one dot of the discontinuous pattern. The dot of impregnating material blend 62 is impregnated into the first and the second textile 12, 14 and fills partially the voids 6 and interstices between the yarns 2 of both textiles 12, 14 forming an impregnated area 22. The impregnated area 22 ends around the middle part of the cross section of both textiles, therefore the outer surface 18 of the first textile 12 and the second surface 19 of the second textile 14 are substantially without impregnating material 62.

Figure 12:
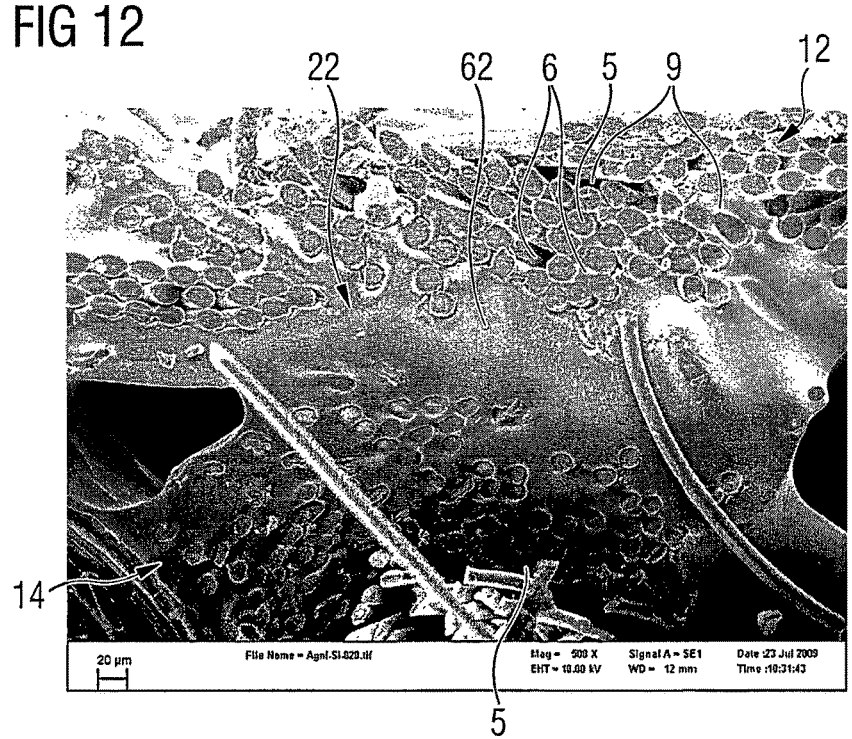
FIG. 12 depicts a SEM of the cross-section of same impregnated area of FIG. 11 in a larger scale.

FIG. 12 shows a SEM of the cross section of a textile composite with two textile layers which are bonded together by the impregnating material blend 62 in a higher magnification. The voids 6 and interstices 9 are filled partially with the impregnating material blend 62 within the impregnating area 22. The SEM shows one dot of the discontinuous pattern. The filled voids 6 and interstices 9 within the impregnated areas 22 avoid that a liquid can be absorbed into these spaces of the textiles.

Figure 13:
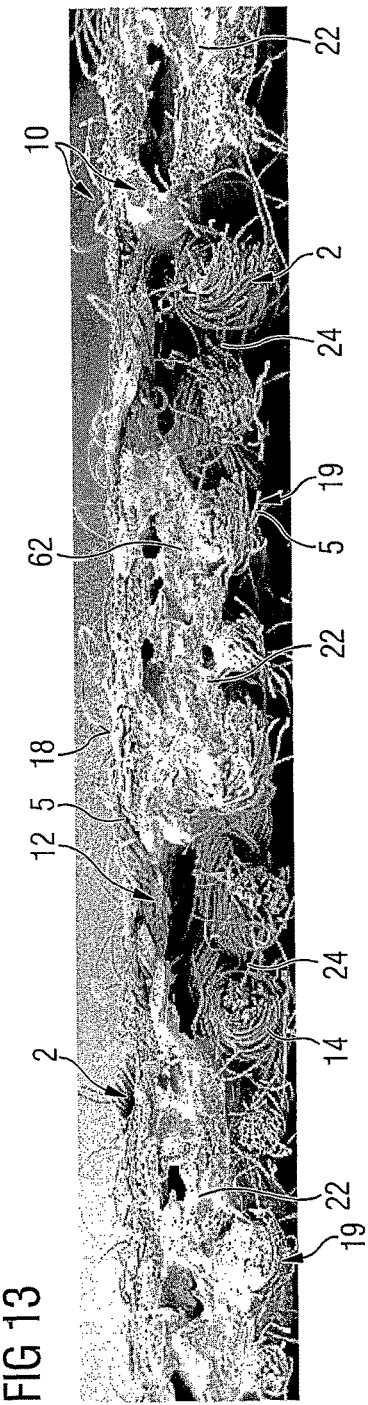
FIG. 13 depicts a SEM of the cross-section of a textile composite with impregnated areas and non-impregnated areas.

FIG. 13 shows another SEM of the cross section of a textile composite 10. The textile composite 10 hast a first textile 12 and a second textile 14 which are bonded together by the impregnating material blend 62 in a discontinuous pattern leading to impregnated areas 22 and non impregnated areas 24. The SEM shows three impregnated areas 22 and two non impregnated areas 24, wherein within the impregnated areas 22 the impregnated material blend 62 is penetrated into the textile structure of the first and the second textile 12, 14. The non impregnated areas 24 are completely free of impregnating material 62 and therefore air- and water vapor permeable. Within the impregnated areas 62 a majority of the voids and interstices are filled up with the impregnating material blend 62. The outer surface 18 of the first textile 12 and the second surface 19 of the second textile 14 are substantially without impregnating material 62 leading there to a substantially unchanged textile hand.

Figure 14:
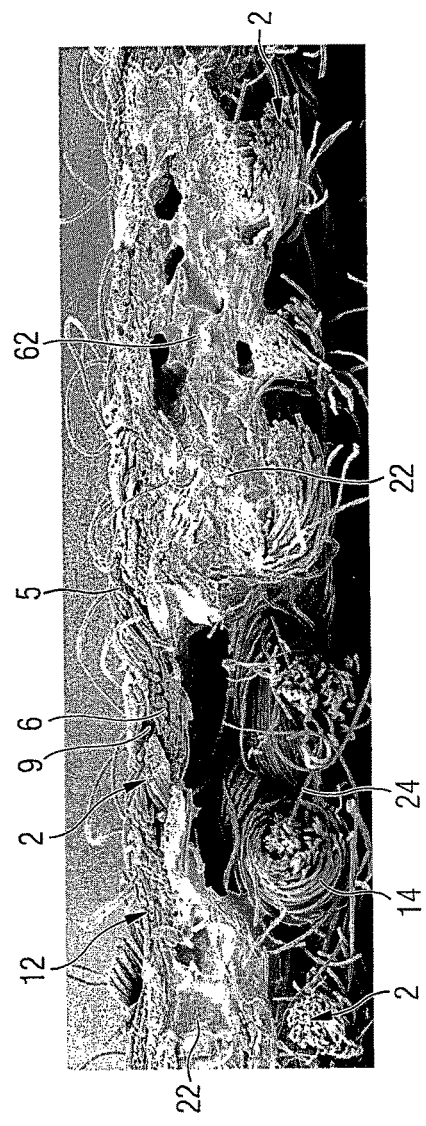
FIG. 14 depicts a SEM of the cross-section of the same impregnated textiles of FIG. 13 in a larger scale.

FIG. 14 shows a SEM of the cross section of the textile composite 10 of FIG. 13 in a higher magnification. The SEM shows a non impregnated area 24 between two impregnated areas 22.

EXAMPLES

Impregnating Material 1(IM1):

An impregnating material was prepared by preparing a silicon solution by mixing a silicone Wacker Elastosil LR 7665 (available from Wacker Chemie AG) in a mixture 1:1. The impregnating material has a viscosity of 20000 mPa/s.

Impregnating Material 2 (IM2):

An impregnating material was prepared by preparing a silicon solution by mixing a silicone Wacker Elastosil Silgel (available from Wacker Chemie AG) in a mixture 1:1. The impregnating material has a viscosity of 2000 mPa/s.

Impregnating Material Blend 1 (IMB1):

A blend of an impregnating material and expandable graphite was prepared by mixing of an expandable graphite (NRC Nordmann, Rassmann article: Nord-Min 251/article #102148) into the impregnating material IM1. The expandable graphite is mixed to IM1 with an amount of 10-45%. The particle size is for min 80% of the particles>0.3 mm.

Impregnating Material Blend 2 (IMB2):

A blend of an impregnating material and expandable graphite was prepared by mixing about between 10-45% of an expandable graphite (NRC Nordmann, Rassmann article: Nord-Min 250/article #102147) into the impregnating material IM1. The expandable graphite has a size of approx. 250-300 μm.

Textile Composite Example 1

A first outer dense textile made of 65% polyester (PES) yarn and 35% cotton yarn is used. The dense textile is a woven textile made of a spun yarn Nm 64/2. The yarn is not pre-treated. The textile has a weight of 180 g/m². The average size of the interstices between the yarns is about 50 μm measured within 1 cm². Such a dense woven textile is available from the company Ibena Textilwerke GmbH, Germany.

The inner surface of the dense textile was impregnated with an impregnating material IM2 by continuous rotation screen printing technique in such a manner as to provide a discontinuous cross pattern (curing at about 150° C. for about 1 minute). The screen has a pattern of separate discrete crosses with a thickness of 120 μm.

The textile weight after the treatment was 245 g/m², therefore the amount of IM2 is about 65 g/m², this is about 36.1% of the textile weight.

Samples of example 1 were tested for air- and water vapor permeability and water absorption value, described herein and reported in table 1.

Textile Composite Example 2:

A first outer dense textile made of 50% Aramid/50% Viscose FR yarn is used. The dense textile is a woven textile made of a spun yarn Nm 60/2. The yarn is not pre-treated. The textile has a weight of 190 g/m². The average size of the interstices is about 60 μm. Such a dense woven textile is available from the company Utexbel, Belguim.

The inner surface of the dense textile was impregnated with the impregnating material IM2 by continuous rotation screen printing technique in such a manner as to provide a discontinuous stripe pattern (curing at about 150° C. for about 1 minute). The screen has a pattern of separate discrete lines.

The textile weight after the treatment was 215 g/m², therefore the amount of IM2 is about 25 g/m², this is about 13.15% of the textile weight.

Samples of example 2 were tested for air- and water vapor permeability and water absorption value, described herein and reported in table 1.

TABLE 1

|  | Weight g/m² | Air-permeability l/m²/s | Ret (m² × Pa)/W | Water absorption Test WPU-Bundesmann | | | | Permetest | |
|---|---|---|---|---|---|---|---|---|---|
|  |  |  |  | Initial (%) | Initial (g/m²) | 10 × HW (%) air dry | 10 × HW (g/m²) air dry | Heat loss (KJ) | Time to re-dry (min) |
| Example 1 textile comp. untreated | 180 | 91 | 2.4 | 61 | 109 | 66 | 123 |  |  |
| Example 1 textile comp. treated | 245 | 33 | 7.2 | 15 | 36 | 26 | 68 |  |  |
| Example 2 textile comp. untreated | 190 | 240 | 3.1 | 75 | 138 | 88 | 176 | 468 | 14 |
| Example 2 textile comp. treated | 215 | 212 | 4.5 | 52 | 114 | 67 | 115 | 230 | 10 |

Table 1 show that the treated samples of example 1 and example 2 are air- and water vapor permeable after the treatment with the impregnating material. That means that the non-impregnated areas are still open for an air and water vapor exchange. The air- and water vapor permeability of the treated samples are reduced but still high. The reason for the reduction is that the voids and interstices in the impregnated areas are not longer available for air- and water vapor transmission because they are filled by the impregnating material. With regard to the water absorption test, the treated samples show a decrease in the water absorption, wherein the water absorption value is less than 70%. Even after several domestic washing circles and air-drying the water absorption value is less than 70%.

Table 1 shows also the re-dry properties of example 2 using the Permetest. FIG. 15 shows the re-drying curve of samples of the untreated and the treated example 2. The samples of example 2 are wetted under defined conditions: 10 min Bundesmann rain exposure according to DIN EN 29865 (1991) and additional 15 sec spinning. With the Permetest the re-dry time and the total heat loss while drying of the samples were measured. The time from placing the wetted samples on the instrument the total heat loss (W/m$^2$) is recorded under defined climate conditions (15° C. at 65% rH/2.5 m/s wind speed). The area underneath the curve during the drying period is the total heat loss in this period. The flat tailing in the curve indicates the time when the textile is dry again.

Textile Composite Example 3

A textile composite was made using a first dense face textile made of 100% polyamide (PA) Taslite twill yarn. The first textile is a woven textile made of a yarn (dtex 78f34). The yarn is not pre-treated. The first textile has a weight of 100 g/m$^2$. The average size of the interstices between the yarns is about 40 µm measured within 1 cm$^2$. Such a woven dense textile is available from the company Ibena Textilwerke GmbH, Germany. The first dense textile is attached to a second backer textile. The first textile forms a face and the second textile forms a backing. The second backer textile is made of 65% polyester (PES) yarn and 35% cotton yarn is used. The second textile is a knitted textile made of spun yarns Nm50/1. The yarn is not pre-treated. The second textile has a weight of 95 g/m$^2$. Such a knitted textile is available from the company Riedel+Tietz Textil GmbH&Co, Germany. The second textile was arranged to the inner side of the first textile to form a two layer textile composite. Samples were testes according to air- and water vapor permeability, water absorption value and horizontal flame test method, described herein and reported in table 2.

Textile Composite Example 4

A two layer textile composite was made substantially according to example 3 but bonded together by the impregnating material blend IMB1. The two layer textile composite laminate was constructed by printing a discontinuous pattern of the impregnating material blend IMB1 onto the inner surface of the first face textile and then adhere the second backer textile to the first face textile between two rollers with a gap of 0.4 mm. The discontinuous pattern of IMB1 was printed by continuous rotation screen printing technique in such a manner as to provide a discontinuous dot pattern. The screen has a pattern of separate discrete dots with a diameter of 2.3 mm and a thickness of 120 µm. The resultant textile composite was a two layer textile laminate of an outer meltable polyamide dense textile and a thermally stable backer textile bonded by a discontinuous pattern of dots of IMB1 with a laminate weight of 261 g/m$^2$. The amount of IMB1 is about 79 g, therefore the impregnating material was applied in an amount of 60% of the first textile weight. The laminate was allowed to cure for about 1 min at a temperature of 150° C. Samples were testes according to air- and water vapor permeability, water absorption value and horizontal flame test method, described herein and reported in table 2.

Textile Composite Example 5

A textile composite was made using a first dense face textile made of 100% polyamide (PA) Taslite twill yarn. The first textile is a woven textile made of yarns (dtex 78f34). The yarn is not pre-treated. The first textile has a weight of 100 g/m$^2$. The average size of the interstices between the yarns is about 40 µm measured within 1 cm$^2$. Such a woven dense textile is available from the company Ibena Textilwerke GmbH, Germany. The first dense textile is attached to a second backer textile. The first textile forms a face and the second textile forms a backing. The second backer textile is a knitted textile made of 100% Nomex (aramide) staple fiber yarn Nm80/1. The yarn is not pre-treated. The second textile has a weight of 58 g/m$^2$. Such a knitted Nomex backer textile is available from the company Estambril S.A. Spain. The second textile was arranged to the inner side of the first textile to form a two layer textile composite. Samples were testes according to air- and water vapor permeability, water absorption value and horizontal flame test method, described herein and reported in table 2.

Textile Composite Example 6

A two layer textile composite was made substantially according to example 5 but bonded together by the impregnating material blend IMB1. The two layer textile composite laminate was constructed by printing a discontinuous pattern of the impregnating material blend IBM1 onto inner surface of the first face textile and then adhere the second backer textile to the first face between two rollers with a gap of 0.5 mm. The discontinuous pattern of IMB1 was printed by continuous rotation screen printing technique in such a manner as to provide a discontinuous dot pattern. The screen has a pattern of separate discrete dots with a diameter of 2.3 mm and a thickness of 120 µm. The resultant textile composite was a two layer textile laminate of an outer meltable polyamide dense textile and a thermally stable backer textile bonded by a discontinuous pattern of dots of IMB1 with a laminate weight of 230 g/m$^2$. The amount of IMB1 is about 72 g, therefore the impregnating material was applied in an amount of 72% of the first textile weight. The laminate was allowed to cure for about 1 min at a temperature of 150° C. The non-impregnated areas of the face first textile of the laminate were treated with a hydrophobic fluorocarbon (Clariant Nuva TTC). Samples were testes according to air- and water vapor permeability, water absorption value and horizontal flame test method, described herein and reported in table 2.

Textile Composite Example 7

A two layer textile composite was made substantially according to example 3 but bonded together by impregnating material blend IMB2. The two layer textile composite laminate was constructed by printing a discontinuous pattern of the impregnating material IMB2 onto inner surface of the first face textile and then adhere the second backer textile to the first face textile between two rollers with a gap of 0.4 mm. The discontinuous pattern of IMB2 was printed by continuous rotation screen printing technique in such a manner as to provide a discontinuous dot pattern. The screen has a pattern of separate discrete dots with a diameter of 2 mm and a thickness of 200 µm. The resultant textile composite was a two layer textile laminate of an outer meltable polyamide dense textile and a thermally stable backer textile bonded by a discontinuous pattern of dots of IMB2 with a laminate weight of 364 g/m$^2$. The amount of IMB1 is about 168 g, therefore the impregnating material was applied in an amount of 165% of the first textile weight. The laminate was allowed to cure for about 1 min at a temperature of 150° C. Samples were testes according to air- and water vapor permeable, water absorption value and horizontal flame test method, described herein and reported in table 2.

Textile Composite Example 8

A two layer textile composite was made substantially according to example 3 but bonded together by the impregnating material blend IMB2. The two layer textile composite laminate was constructed by printing a discontinuous pattern of the impregnating material blend IMB2 onto inner surface of the first face textile and then adhere the second backer textile to the first face textile between two rollers with a gap of 0.4 mm. The discontinuous pattern of IMB2 was printed by continuous rotation screen printing technique in such a manner as to provide a discontinuous dot pattern. The screen has a pattern of separate discrete dots with a diameter of 2 mm and a thickness of 200 μm. The resultant textile composite was a two layer textile laminate of an outer meltable polyamide dense textile and a thermally stable backer textile bonded by a discontinuous pattern of dots of IBM2 with a laminate weight of 364 g/m². The amount of IMB1 is about 172 g, therefore the impregnating material was applied in an amount of 165% of the first textile weight. The laminate was allowed to cure for about 1 min at a temperature of 150° C. The non-impregnated areas of the face first textile and the second backer textile of the laminate were treated with a hydrophobic fluorocarbon (Clariant Nuva HPU). Samples were testes according to air- and water vapor permeability, water absorption value and horizontal flame test method, described herein and reported in table 2.

than 70%. Even after several domestic washing circles and tumble-dry the water absorption value is almost less than 70%.

Table 2 furthermore shows that the treated samples of example 4, 6, 7 and 8 were tested for flame resistant according to the flame resistant test as described herein. As reported in table 2, all treated samples having no after flame after exposure to a flame for 10 sec.

Test Procedures

Air Permeability:

To measure the air permeability of a fabric (textile), a test machine which can measure the air flow through the fabric is used. The samples are placed between two rings which results in a test area of 100 cm². Air is sucked through the sample at a constant pressure of 100 Pa. Hereby the amount of air coming through the sample is measure and calculated in 1/m²/s. The test method is described in EN ISO 9237.

Water Vapor Transmission Rate:

RET test method for the textile layers, the textile composite article and barrier layer:

The water vapour transmission resistance (Ret) is a specific material property of sheet like structures or composites which determine the latent evaporation heat flux through a given area under a constant partial pressure gradient. A textile layer, a textile composite or a barrier layer as described in the invention is water vapour permeable if it has a water vapour transmission resistance Ret of below 150 (m²×Pa)/W. The barrier layer preferably has a Ret of below 20 (m²×Pa)/W. The water vapour permeability is measured by the Skin model according to ISO 11092 (2005).

TABLE 2

| | | Air-perme- | Ret | Flame | Water absorption Test WPU-Bundesmann | | | |
|---|---|---|---|---|---|---|---|---|
| | Weight g/m² | ability l/m²/s | (m²Pa)/W | 10 sec areas | Initial (%) | Initial (g) | 10 × HW (%) tumble | 10 × HW (g) tumble |
| Example 3 | 195 | 230 | 4.8 | burn | 96.3 | 188 | 108.3 | 235 |
| Example 4 (treated) | 261 | 120 | 7.8 | No after flame | 59.3 | 155 | 76 | 194 |
| Example 5 | 158 | 240 | 4.6 | burn | 108 | 186 | 120 | 190 |
| Example 6 (treated) | 230 | 197 | 7.2 | No after flame | 23 | 54 | 34 | 82 |
| Example 7 (treated) | 360 | 145 | 8.2 | No after flame | 26 | 94 | 45.7 | 172 |
| Example 8 (treated) | 364 | 150 | 8.2 | No after flame | 17 | 62 | 27 | 101 |

Table 2 shows that the treated samples of examples 4, 6, 7 and 8 are air- and water vapor permeable after the treatment with the impregnating material. That means that the non-impregnated areas are still open for an air and water vapor exchange. The air- and water vapor permeability of the treated samples of example 4 and 6 are reduced but still high. The reason for the reduction is that the voids and interstices in the impregnated areas are not longer available for air- and water vapor transmission because they are filled by the impregnating material. With regard to the water absorption test, the treated samples show a decrease in the water absorption, wherein the water absorption value is less Water Impermeability:

Measurement of the water impermeability is carried out in accordance with International Standard ISO 811. In one embodiment the barrier layer is resistant to water pressure up to 0.13 bar.

Water Absorption:

One method of determining the water absorption properties of textile structures is using a rain test according to the Bundesmann test (DIN EN 29865) (1991). The rain unit creates rain defined by water volume, drop size and distance of rain unit to test samples. The test runs for 10 minutes.

The water absorption of the textiles and textile composite articles are measured according to the following method:

1. Determination of the weight of the sample (textile/textile composite)
2. Performing the Bundesmann rain test for 10 minutes
3. Spinning of the sample for 15 s
4. Determination of the weight of the sample
5. Calculation of the weight gain in % related to the sample before the Bundesmann rain test.

The measurement of the water absorption test was carried out on untreated textiles and textile composite articles; on impregnated textiles and textile composite article samples according to the invention and on treated textiles and textile composite article samples according to the invention and after 10 domestic washing cycles at 60° C. (air or tumble drying).

Domestic Washing:

The washing was carried out by a domestic washing cycle at 60° C. in accordance with International Standard ISO 6330/2A (1984) with an afterwards air drying (ISO 6330/2A-A) or a tumble drying (ISO 6330/2A-E).

Viscosity of the Impregnating Material:

The viscosity of the polymer material can measure with a rotation measure apparatus (Viscosimeter), for example by the company Rheotec or Brookfield.

Flame Resistant

Measurement of flame retardant was carried out in accordance with International Standard ISO 15025 (2003) for 10 sec flame to surface. Outer textile face of the sample was exposed to the flame for 10 sec. After flame time was recorded. Samples with an after flame time of greater than 10 sec were considered as flammable. Samples with an after flame of 10 sec or less were considered as non-flammable. Preferred samples have an after flame of 3 sec or less. Most preferred samples have no after flame.

Average Size of the Interstices:

The interstices between the yarns in a dense manufactured textile have an average size of less than 100 μm measured within 1 cm$^2$. In a woven textile an interstice 9 is formed at the crossing point between two parallel warps yarns and two parallel weft yarns (see FIG. 3).

To measure the average size of the interstices, a light microscope (e.g. a Zeiss-microscope) is used. The size of each and all interstices (i.e. the size of all crossing points) are measured with a light microscope within a predetermined textile area of 1 cm×1 cm. The measurement is done on the top view of the textile area of 1 cm×1 cm. The average size of the interstices is calculated from the sizes of all interstices (even if the size may be zero) within the predetermined textile area. The microscope has preferably a 50× magnification in combination with an electronic measuring program for distances. Any further useful magnification can be used.

Permetest:

The Permetest is a fast response measuring instrument (skin model) for the determination of water-vapour and thermal resistance or permeability of textile fabrics, nonwovens, foils and paper sheets. The instrument provides all kinds of measurements very similar to the ISO Standard 11092 (2005), and the results are evaluated by the identical procedure as required in the ISO 11092 (2005). The differences in relation to this standard depend in smaller samples.

Permetest measurement is especially interesting for measuring the changing in heat loss of a wet fabric while re-drying. If the temperature of the heated plate of the Permetest is set to the skin temperature of 35° C. and the ambient conditions are set to 15° C. and 65% rH with a wind speed of 2.5 m/sec, this simulates the re-drying of a wet fabric while wearing it in these conditions.

Without intending to limit the scope of the present invention, the foregoing illustrates how the present invention may be made and used.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A textile composite article comprising:
 a first textile with an inner surface and an outer surface, said first textile comprising:
  yarns comprising multiple fibers having voids between the fibers and interstices between said yarns; and
  a discontinuous pattern of an impregnating material which penetrates at least partially a cross section of said first textile between the inner surface and the outer surface;
  wherein the discontinuous pattern comprises a plurality of impregnated areas separated by and completely surrounded by non-impregnated areas;
 wherein at least a portion of the voids and at least a portion of the interstices located in the impregnated areas are filled with said impregnating material;
 wherein said water absorption value of said textile composite is 70% or less according to DIN EN 29865 (1991); and
 wherein the non impregnated areas lead to an air permeability of the article of more than 20 l/m$^2$/s.

2. The article of claim 1, wherein a majority of the voids located in the impregnated areas are filled with said impregnating material.

3. The article of claim 1, wherein the amount of impregnating material is at least 10% of the first textile weight.

4. The article of claim 1, wherein the impregnating material is selected from the group consisting of silicones, polyurethane, amorphous perfluoropolymer and mixtures thereof.

5. The article of claim 1, wherein the impregnating material contains one or several additives.

6. The article of claim 5, wherein at least one of the additives comprises expandable graphite.

7. The article of claim 1, wherein the non-impregnated areas comprise at least one functional coating material creating coated areas.

8. The article of claim 1, wherein the first textile comprises a meltable material.

9. The article of claim 1, further comprising a second textile adjacent to the inner surface of the first textile.

10. The article of claim 9, wherein the second textile is bonded to the first textile by the impregnating material.

11. The article of claim 10, wherein the second textile comprises fibers/filaments having voids between the fibers/filaments and the impregnating material penetrates at least partially a cross section of said second textile from a first surface to a second surface of the second textile creating impregnated areas and non-impregnated areas in accordance with the discontinuous pattern of the impregnating material; wherein at least a portion of the voids in the impregnated areas are filled with said impregnating material.

12. The article of claim 11, wherein a majority of the voids present in the impregnated areas of the second textile are filled with said impregnating material.

13. The article of claim 9, wherein the second textile comprises a non-meltable and/or flame retardant material.

14. The article of claim 1, comprising at least one water-vapor permeable barrier layer.

15. The article of claim 9, wherein an air impermeable, liquid impermeable and water-vapor permeable barrier layer is joined to one surface of the first textile or the second textile.

16. The article of claim 14, wherein the barrier layer comprises a porous membrane made of expanded polytetrafluoroethylene (ePTFE).

17. The article of claim 9, wherein the first textile and the second textile are bonded together by the impregnating material containing expandable graphite, said article shows no after flame after exposure to flame for 10 sec according to the horizontal flame test according to ISO 15025 (2003).

18. The article of claim 1, wherein the first textile comprises a dense textile structure.

19. The article of claim 18, wherein the first dense textile consists of yarns with interstices between the yarns, the interstices having an average size between the yarns of less than 100 μm measured within 1 cm$^2$.

20. Clothing comprising the textile composite article of claim 11.

21. A textile composite article comprising:
a dense textile with an inner surface and an outer surface, said dense textile comprising:
  yarns comprising multiple fibers having voids between the fibers and interstices between said yarns; and
  a discontinuous pattern of an impregnating material which penetrates at least partially a cross section of said first textile between the inner surface and the outer surface;
  wherein the discontinuous pattern comprises a plurality of impregnated areas separated by and completely surrounded by non-impregnated areas;
wherein at least a portion of the voids and at least a portion of the interstices located in the impregnated areas are filled with said impregnating material;
wherein said water absorption value of said textile composite is 70% or less according to DIN EN 29865 (1991);
wherein said interstices have an average size between and the yarns of less than 100 μm measured within 1 cm$^2$; and
wherein the non impregnated areas lead to an air permeability of the article of more than 20 l/m$^2$/s.

22. A textile composite article comprising:
a first textile with an inner surface and an outer surface, said first textile comprising:
  yarns comprising multiple fibers having voids between the fibers and interstices between said yarns; and
  a discontinuous pattern of an impregnating material which penetrates at least partially a cross section of said first textile between the inner surface and the outer surface;
  wherein the discontinuous pattern comprises a plurality of impregnated areas separated by and completely surrounded by non-impregnated areas;
wherein at least a portion of the voids and at least a portion of the interstices located in the impregnated areas are filled with said impregnating material;
wherein said water absorption value of said textile composite is 70% or less according to DIN EN 29865 (1991);
wherein said impregnating material is substantially located only within said voids and said interstices;
wherein the non impregnated areas lead to an air permeability of the article of more than 20 l/m$^2$/s.

23. The article of claim 1, wherein the discontinuous pattern of the impregnated material is discontinuous across the inner surface or the outer surface.

24. The article of claim 1, wherein the discontinuous pattern of the impregnated material comprises dots across the inner surface or the outer surface.

25. The article of claim 1, wherein the discontinuous pattern of the impregnated material is discontinuous across the inner surface or the outer surface into the first textile.

* * * * *